May 11, 1926.                                                                    1,584,275
C. R. CHALKLEY
VACUUM BREAKER AND FLUID DEFLECTOR FOR VEHICLES
Filed Nov. 30, 1925
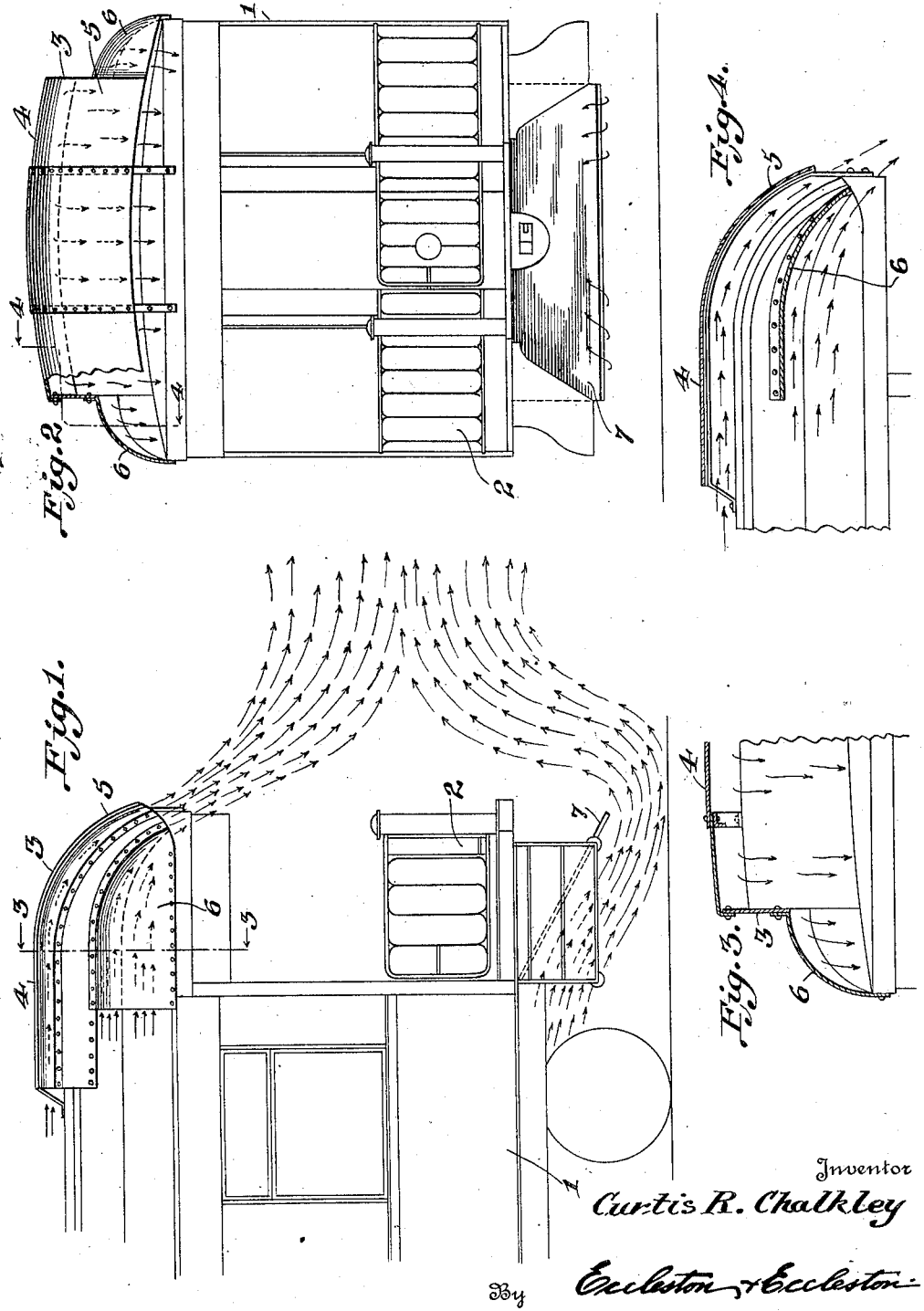

Patented May 11, 1926.

1,584,275

UNITED STATES PATENT OFFICE.

CURTIS R. CHALKLEY, OF COVINGTON, KENTUCKY.

VACUUM BREAKER AND FLUID DEFLECTOR FOR VEHICLES.

Application filed November 30, 1925. Serial No. 72,283.

This invention relates to certain devices used in connection with vehicles, particularly railroad cars, the purpose of which is to eliminate the dirty condition at the rear end of vehicles.

It is a well known physical law that whenever a body moves through any medium the pressure is increased on the head end, and decreased immediately adjacent to the rear end. This decrease in pressure or partial vacuum, created at the rear end, which is proportional to the speed, results in all sorts of foreign material being drawn into and about the rear end of the vehicle. This results in an unclean condition of the rear end of the vehicle, so obnoxious to passengers that many prefer to remain in the car rather than expose themselves to the dirt which is continually being collected at the observation end of a railroad car, or at the rear end of any other vehicle.

The purpose of the present invention is to avoid the above-mentioned disagreeable conditions, by neutralizing the vacuum created at the rear of the moving vehicle.

The invention will be clearly understood from the following detailed description, when considered in connection with the accompanying drawings; in which, Figure 1 is a side elevational view of the rear portion of a railroad car, with the deflecting devices applied thereto; the arrows illustrating the course of the deflected currents.

Figure 2 is an end view of the rear portion of a railroad car provided with the deflecting devices; parts being broken away to more clearly show the construction.

Figure 3 is a fragmentary vertical transverse sectional view taken on line 3—3 of Figure 1; and Figure 4 is a fragmentary vertical longitudinal sectional view taken on line 4—4 of Figure 2.

Referring to the drawings more in detail, numeral 1 refers generally to the rear portion of a railroad car, having an observation or other platform 2.

A deflector, indicated generally by numeral 3, is mounted on the roof of the car, at the extreme rear end thereof. This deflector has a central portion 4 above the central elevated portion of the car roof. This portion of the deflector extends rearwardly in parallel relation to the top of the roof and is then curved downwardly, as indicated by numeral 5, to give the desired direction to the air currents, as indicated by the arrows in Figures 1, 2 and 4. At each side of the central portion of the deflector, is a side deflector 6. These side deflectors are also curved downwardly at their rear ends, to give the same direction to the air currents.

From an inspection of Figure 1 it will be apparent that the current of air picked up by the deflector and directed downwardly at the rear of the vehicle, will partially neutralize the vacuum created at the rear of the vehicle.

Another deflector, indicated by numeral 7, is arranged beneath the car and adjacent its rear end, as clearly illustrated in Figures 1 and 2. This deflector is preferably arranged between the car steps, and it will, of course, be set at a predetermined angle to direct the current of air in the direction indicated by the arrows, as illustrated in Figures 1 and 2. The air passing beneath this deflector will rise directly to the rear of the car and further neutralize the partial vacuum created by the moving vehicle.

While I have illustrated the invention in connection with a railroad car, of the type known as observation cars, it is apparent that the invention is in no manner limited to such use, for it is equally well adaptable to motor busses, motor cars, electric cars, or any other moving vehicle.

It is also apparent that I may provide any suitable means for adjusting the direction of flow of the deflected air currents.

The structure is extremely simple and it is believed that any detailed description of the operation is unnecessary. The movement of the vehicle creates a partial vacuum at the rear end thereof; and obviously this vacuum functions as a dust and dirt collector. If the vacuum is neutralized then there will be no force directing dirt, dust, etc., onto the rear platform. The apparatus disclosed herein directs one current downwardly from the top of the car, and another current upwardly from beneath the car. These two currents enter the space which would be in a state of partial vacuum and neutralize or substantially neutralize the partial vacuum, thereby eliminating the cause of the collection of dust, dirt, etc., at the rear end of a moving vehicle.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. An apparatus of the character described, including a conventional vehicle having an open rear platform, and means for directing a current of air downwardly at the rear of the vehicle from a point adjacent the top thereof.

2. An apparatus of the character described, including a conventional vehicle having an open rear platform, a deflector adjacent the top and at the rear end of said vehicle, said deflector constructed to deflect a current of air downwardly and to the rear of said vehicle while the vehicle is in motion.

3. An apparatus of the character described, including a conventional vehicle having an open rear platform, and a downwardly inclined deflector arranged adjacent the top and at the rear end of said vehicle, for the purpose described.

4. An apparatus of the character described, including a railroad car, a downwardly inclined deflector mounted on the elevated portion of the roof of said car at the rear end thereof, and a downwardly inclined deflector arranged on each side of the central deflector.

5. An apparatus of the character described, including a conventional vehicle having an open rear platform, and means for directing a current of air upwardly from the bottom of said vehicle and immediately adjacent the rear end thereof.

6. An apparatus of the character described, including a conventional vehicle having an open rear platform, a deflector mounted beneath the rear end of said vehicle, said deflector constructed to deflect a current of air upwardly immediately adjacent the rear end of said vehicle.

7. An apparatus of the character described, including a conventional vehicle having an open rear platform, and means for neutralizing the partial vacuum created at the rear of said vehicle during movement thereof.

8. An apparatus of the character described, including a conventional vehicle having an open rear platform, and means for supplying a current of air to neutralize the partial vacuum created at the rear of said vehicle during movement thereof.

9. An apparatus of the character described, including a conventional vehicle having an open rear platform, and means for supplying two oppositely directed currents of air to neutralize the partial vacuum created at the rear of said vehicle during movement thereof.

10. An apparatus of the character described, including a conventional vehicle having an open rear platform, two deflectors mounted at the rear of said vehicle, one of said deflectors mounted on the top of the vehicle and the other of said deflectors mounted beneath the vehicle, the upper deflector constructed to deflect a current of air downwardly, and the lower deflector constructed to deflect a current of air upwardly.

CURTIS R. CHALKLEY.